United States Patent [19]

Honig

[11] 4,313,353
[45] Feb. 2, 1982

[54] CONTROL SYSTEM FOR AN AUTOMATIC TRANSMISSION

[75] Inventor: Ernst-August Honig, Wolfsburg, Fed. Rep. of Germany

[73] Assignee: Volkswagenwerk Aktiengesellschaft, Wolfsburg, Fed. Rep. of Germany

[21] Appl. No.: 83,383

[22] Filed: Oct. 10, 1979

[30] Foreign Application Priority Data

Oct. 13, 1978 [DE] Fed. Rep. of Germany ....... 2844665

[51] Int. Cl.³ ...................... B60K 41/04; B60K 41/10
[52] U.S. Cl. ...................................... 74/868; 74/861; 74/865; 74/867
[58] Field of Search ................. 74/867, 868, 869, 856, 74/861, 878, 877, 865, 862

[56] References Cited

U.S. PATENT DOCUMENTS

| | | | |
|---|---|---|---|
| 2,968,967 | 1/1961 | Ross, Jr. ................................. | 74/877 |
| 3,435,712 | 4/1969 | Schaefer ................................. | 74/856 |
| 3,595,102 | 7/1971 | Ohya et al. ........................... | 74/868 |
| 3,650,160 | 3/1972 | Higuchi et al. .................... | 74/868 X |
| 3,733,927 | 5/1973 | Uozumi et al. ...................... | 74/868 |
| 3,859,873 | 1/1975 | Miyauchi et al. .................... | 74/867 |
| 3,871,250 | 3/1975 | Miyauchi et al. .................... | 74/867 |
| 3,952,614 | 4/1976 | Iijima ................................... | 74/868 |
| 4,006,652 | 2/1977 | Murakami ............................ | 74/869 |
| 4,020,718 | 5/1977 | Miyauchi et al. .................... | 74/869 |
| 4,046,032 | 9/1977 | Braun et al. ......................... | 74/865 |
| 4,046,033 | 9/1977 | Hashimoto et al. ................. | 74/869 |
| 4,082,011 | 4/1978 | McQuinn et al. .................... | 74/862 |
| 4,129,051 | 12/1978 | Shindo et al. ........................ | 74/867 |
| 4,136,584 | 1/1979 | Ishikawa ............................... | 74/867 |

FOREIGN PATENT DOCUMENTS

| | | | |
|---|---|---|---|
| 589600 | 12/1959 | Canada ................................. | 74/867 |
| 2406208 | 8/1975 | Fed. Rep. of Germany ........ | 74/856 |
| 404807 | 3/1942 | Italy .................................... | 74/877 |
| 293341 | 12/1953 | Switzerland ......................... | 74/877 |

*Primary Examiner*—Leslie Braun
*Attorney, Agent, or Firm*—Brumbaugh, Graves, Donohue & Raymond

[57] ABSTRACT

A control system for an automatic transmission of a motor vehicle having a mechanical planetary gear train with hydraulically actuatable gear shift elements, and a manual control valve for delivering a first pressurized fluid to a selected gear shift element when said lever is in one of said forward drive positions comprises a main control valve, responsive to the position of the accelerator pedal and the speed of said vehicle, for controlling the supply of the first pressurized fluid from the manual control valve to the selected element. The main control valve comprises a piston having a first piston surface, which is displaceable between a first position for connecting the supply of first pressurized fluid and a second position for interrupting the supply of first pressurized fluid thereby to disconnect the clutch. A spring acts on the piston against an accelerator pedal position-dependent second fluid pressure which acts on the first piston surface. The piston also has a second piston surface opposed to the first piston surface, and a vehicle speed-dependent third fluid pressure is provided for acting on the second piston surface in opposition to the accelerator pedal position-dependent pressure only when the piston is in the second position, that is, the disengage position.

8 Claims, 1 Drawing Figure

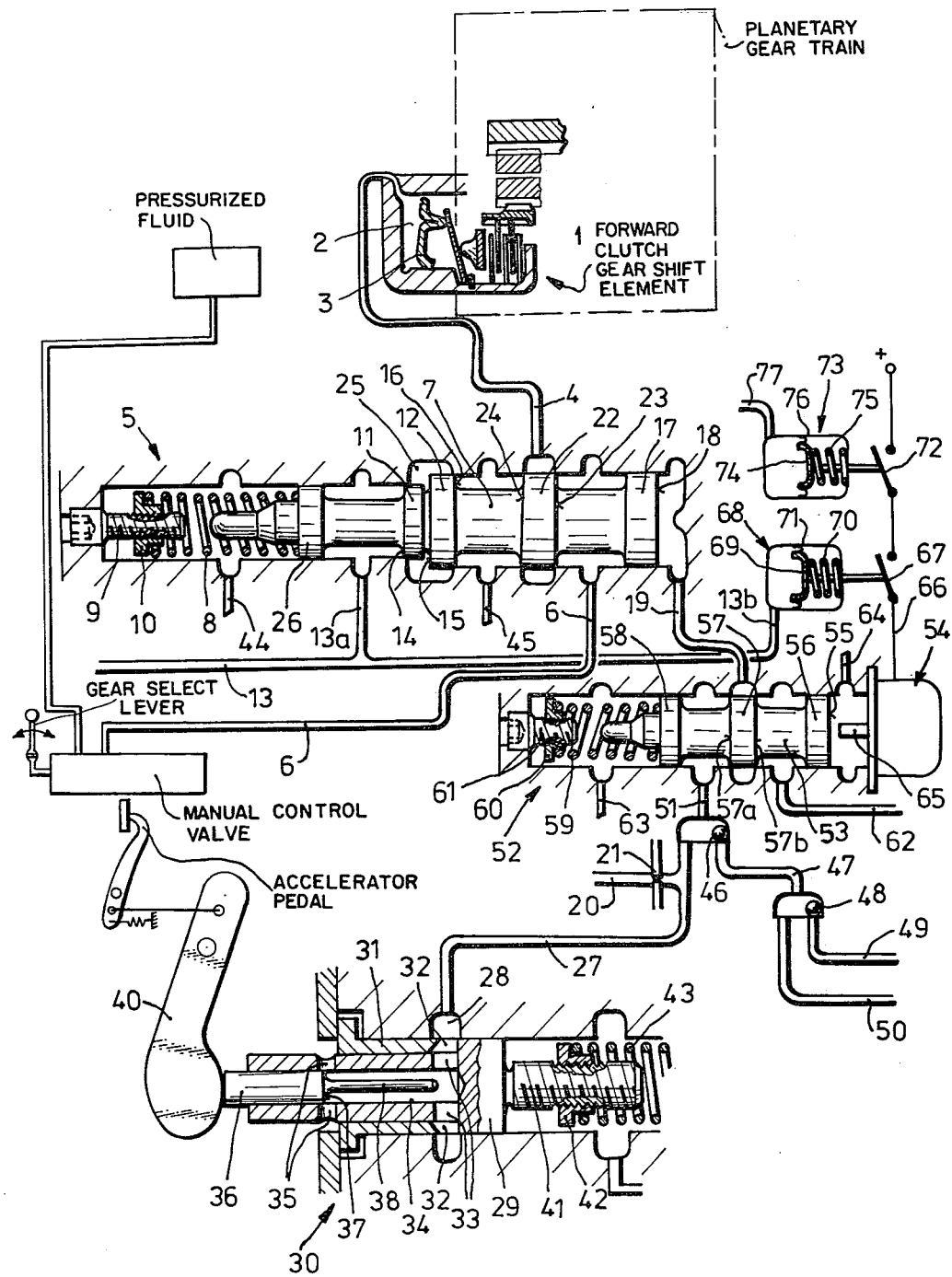

CONTROL SYSTEM FOR AN AUTOMATIC TRANSMISSION

BACKGROUND OF THE INVENTION

The present invention relates to a control system for an automatic transmission for motor vehicles of the type having a mechanical planetary gear train with hydraulically actuated controls for selective engagement of the transmission elements, which control system automatically disconnects the forward gear clutch of the transmission at certain operating states of the vehicle, e.g. when the accelerator pedal is released and the vehicle is stationary.

A control system of the general type has been disclosed in commonly owned U.S. patent application Ser. No. 061,058, filed July 26, 1979. A manual control valve delivers a first pressurized hydraulic fluid to actuate a control element which is selected by the gear select lever of the transmission when the transmission is in one of the forward gears. A main control valve is arranged in the fluid line between the manual control valve and the gear shift element and operates as a function of the accelerator pedal position and the speed of the vehicle. The main control valve includes a piston which is displaceable to control the delivery of the first pressurized fluid to the selected gear shift element. The piston is acted upon by a spring, an accelerator pedal position dependent fluid pressure, and a vehicle speed dependent fluid pressure.

In hydrodynamic-mechanical automobile transmissions, when the vehicle is stationary and idling engine load continues to be transmitted through the transmission to the power train and the wheels. This normally results in vehicle creep and also acts to transmit engine vibrations through the power train. In the aforementioned U.S. patent application Ser. No. 061,058, a control system is shown and described which under certain operating conditions of the vehicle, for example, when the vehicle is stationary and idling, interrupts the mechanical connection between the engine and the wheels so that creeping does not occur. At the same time, vibration originating at the motor is not transmitted through the drive train and thus vehicle oscillations are suppressed.

More particularly, the main control valve, which is interposed in the delivery line between the manual control valve and selected gear shift element, interrupts the supply of pressurized fluid to the gear shift element when the accelerator pedal is released and vents the fluid in the forward clutch, thereby to disengage the forward clutch when the vehicle is stationary and the accelerator pedal is released. The forward clutch remains disengaged until the accelerator pedal is at least partially depressed or until detection of other conditions, for example, a change in the position of the gear select lever (e.g., when the lever is moved to the position "1" or "2" instead of automatic forward drive "D") or the detection of a predetermined vehicle speed.

More particularly, in the control system described in the aforementioned U.S. patent application Ser. No. 061,058, the main control valve is connected to a second fluid line which delivers an accelerator pedal position dependent pressure to act on the piston of the valve, thereby to selectively engage or disengage the forward gear clutch. A purging control valve is connected to this fluid line and is actuated by the accelerator pedal to vent the fluid line when the accelerator pedal is released. On one embodiment, the main control valve is controlled as a function only of the position of the accelerator pedal, that is, the accelerator dependent pressure in the fluid line. In this embodiment the forward gear control or selected gear shift element disengages at all times when the accelerator pedal is released regardless of the speed of the vehicle.

In a preferred embodiment, the piston of the main control valve is also controlled as a function of the vehicle speed. A vehicle speed-dependent pressure is supplied to the main control valve and acts cumulatively with the accelerator pedal dependent pressure against the force of the return spring. In this embodiment the selected gear shift element disengages only when both the accelerator pedal is released and the vehicle is moving below a pre-set speed, for example, at idle or very low road speeds.

SUMMARY OF THE INVENTION

The present invention is an improved control system for an automatic transmission of a motor vehicle of the type having a mechanical planetary gear train with hydraulically actuatable gear shift elements and which includes a main control valve which disengages the forward gear clutch whenever the accelerator pedal is released. This arrangement offers the advantage that at times when the power link between the engine and wheels is interrupted and the vehicle is thereby coasting, frictional losses in the engine (which continues to run at idling speed) and the transmission are reduced since engine drag is not present.

In the control system according to the aforementioned U.S. patent application Ser. No. 061,058, the embodiment which operates in this mode possesses a disadvantage in that when the forward clutch is reengaged, which occurs immediately when the accelerator pedal is partially depressed, vehicle shock can occur at higher road speeds. This occurs because the clutch reengages immediately, but the engine is idling and not rotating at road speed r.p.m. In the present invention, the control system acts to reengage the forward gear clutch but at the same time avoid transmission shock.

More particularly, in the present invention the main control valve piston is provided with a second piston surface opposed to the first piston surface (which is acted on by the accelerator pedal position dependent pressure). A source of vehicle speed dependent pressure is provided to the second piston surface to act in conjunction with the force of the spring against the accelerator pedal pressure force. The vehicle speed dependent fluid pressure, however, is provided to the second piston surface only when the piston is already in the disengage position, that is, a position in which the forward gear clutch fluid is vented and the clutch is disengaged.

In this arrangement, when the piston is in the disengaged position and the vehicle is moving, a higher accelerator pedal dependent pressure is required to overcome the combined forces on the piston from the spring and the speed dependent pressure. In other words, when the accelerator pedal is initially depressed, the initial pressure provided to the main control valve will not be sufficient to reengage the forward gear clutch. Rather, the accelerator pedal must be depressed further to build up the pressure in the line before the main control valve piston moves to the re-engage position. By this time, however, engine r.p.m. has increased up to road speed such that engine r.p.m. and the power train r.p.m. are substantially synchronized when the power gear clutch reengages.

The second piston surface, which is acted on by the speed dependent pressure, preferably consists of an annular step area between two piston shoulders of unequal diameter and is disposed in the main control valve such that the speed dependent pressure force reaches the second piston surface only when the piston is in the disengaged position. Accordingly, the annular step area is disposed in a pressure chamber and the delivery of speed dependent pressure to the chamber is controlled by a control edge on the smaller of the two shoulders.

In a further refinement of the invention, the second fluid line (delivering accelerator pressure to the first piston surface) may contain a brake pedal dependent control valve such that disengagement of the forward gear clutch when the accelerator pedal is released will not occur if, in addition, the brake pedal is depressed. As a result, during vehicle braking the engine remains engaged to the drive train and assists in braking the vehicle.

The brake pedal control valve includes a control piston acted on by a spring and brake pedal position dependent actuation device providing a force on the control piston in opposition to the spring. When the brake pedal is released, the brake pedal dependent control valve connects the accelerator pedal dependent second fluid delivery line to the purging control valve, such that the pressure in that fluid line depends only on the position of the accelerator pedal. When the brake pedal is actuated, however, the brake pedal control valve connects the accelerator pedal second pressure line leading to the main control valve with a source of main pressure which assures that the main control valve piston and forward gear clutch remain in the engaged position.

Preferably, the brake pedal control valve is also controlled as a function of vehicle speed such that the brake pedal control valve is actuated (to connect the second fluid line to the source of main pressure) only above a predetermined road speed. At lower vehicle speeds, regardless of whether the brake pedal is actuated the main control valve remains connected to the purging control valve such that the forward gear clutch disengages whenever the accelerator pedal is released. This is advantageous since, for example, at idling it may be desired to keep the brake pedal depressed but nevertheless disconnect the forward gear clutch to prevent creeping. Also, engine braking is usually not needed at lower vehicle speeds.

In a preferred embodiment, an electromagnet is connected to a brake light switch which is energized when the brake pedal is depressed, thereby to actuate the electromagnet. The electromagnet is coupled to the brake pedal control valve thereby to move the valve control piston when the brake pedal is depressed. A second switch, which opens when the vehicle speed falls below a predetermined value, may be provided in the circuit acting on the electromagnet so that the control valve is actuated only when both the vehicle speed is above a predetermined minimum and the brake pedal is depressed, i.e. when both switches are closed.

BRIEF DESCRIPTION OF THE DRAWING

The drawing represents a schematic illustration of a preferred embodiment of a control system for an automatic transmission according to the invention.

DETAILED DESCRIPTION OF A PREFERRED EMBODIMENT

Referring to the drawing, a forward clutch 1 associated with the forward gears of a hydrodynamic-mechanical automobile transmission includes a pressure chamber 2 and an actuating piston 3. The pressure chamber 2 is connected with a first pressurized fluid line 4, which is connected through a main control valve 5 to a pressure fluid line 6 coming from a manual control valve, not shown. Connection between the lines 4 and 6 is controlled as a function of the position of the accelerator pedal (not shown) and of the vehicle speed by the main control valve 5. The pressurized fluid line 6 provides main pressure in all forward gears, which means that it carries the highest pressure utilized in the transmission control system generated by the gear pump, and is regulated dependent upon engine load by the so-called main pressure slide valve (not shown).

The main control valve 5 has a piston 7 acted on by a spring 8 seated in a piston collar 26 of the piston 7. The force of the spring 8 is variable through an adjustment screw 9 acting on a plate 10. The spring 8 is counteracted by an accelerator pedal position-dependent second source of fluid pressure, delivered through a second pressurized fluid line 19, which acts on the piston end face 18 of the shoulder 17. A second piston surface 15 is formed on the piston 7 in the form of an annular step area between two piston shoulders 11 and 12, and is disposed in a pressure chamber 25. A pair of control edges 14 and 16 provided on the two shoulders 11 and 12 operate to open the chamber 25 either to a fluid line 13a leading to the line 13 carrying a vehicle speed dependent third source of pressurized fluid, namely the so-called governor pressure, or to a fluid line 45 leading to the atmosphere, depending upon the position of the piston 7.

The piston 7 is displaceable to the left or right from the intermediate position shown in the drawing dependent upon the particular spring force and the fluid pressures acting on the piston surfaces, such that the control edges 23 and 24 provided on a shoulder 22 connect the fluid pressure line 4 either to the pressurized fluid delivery line 6 or to the fluid discharge 45. In the latter case, where the force of the spring 8 overcomes the force on the piston surface 18 from the accelerator pedal position dependent pressure, the line 4 is connected to the discharge 45, and thus the forward clutch 1 is disengaged. The magnitude of the force of spring 8, and the area of the piston surface 18 are so designed that the force of spring 8 will preponderate only if the pressure in the control line 19 has dropped practically to atmospheric pressure, which is the case, by virtue of the control valve 30 to be described later, when the accelerator is released.

In this position of the piston 7, associated with disengagement of the control 1 where the piston 7 has moved toward the right in the figure, the pressure chamber 25 of the valve 5 is connected to the fluid delivery line 13a and thereby line 13 delivering a vehicle speed dependent pressure, so that the second piston surface 15 is acted upon by that pressure. The resulting force—operative only in the disengage position of piston 7—is additive to the force of the spring 8 and thereby requires a greater fluid pressure in the line 19 to return the piston 7 to the engage position. Thus, where due to release of the accelerator pedal the piston 7 has moved to the right and thus the clutch 1 has disengaged, the clutch does not re-engage immediately when the accelerator pedal is depressed for all operating states of the vehicle. Where the vehicle is moving and thus a speed dependent fluid pressure is acting on the piston surface 15, the piston 7 moves into the engagement position only when there is a higher pressure in the fluid line 19, i.e. when the accelerator pedal is further depressed and the engine speed has increased accordingly. The shock described above when the clutch is re-engaged while the vehicle is in motion is thus avoided.

Assuming that the fluid line 19 is connected through the brake pedal position-dependent control valve 52 (to be described below) to the connector line 51, the line 19 then communicates by way of a throttle 21 to a pressure line 20 carrying a source of pressurized fluid which is dependent on engine load, namely, according to the position of the accelerator pedal or engine throttle, which pressure is less than the main pressure and which is also used for the transmission control. As a result, an accelerator pedal dependent pressure is present in the line 19 and acts on the piston surface 18 of piston 7 in the main control valve 5. However, even when the accelerator is released, there is still a certain idling pressure in the line 20 that would hold the piston 7 in a clutch engagement position against the action of the spring 8, in which position the pressure line 4 is connected to the line 6 leading to the manual control valve. This occurs regardless of engine speed, since piston area 15 is not acted on. Where the piston 7 is in the engage position, the edge 16 of shoulder 12 opens the pressure chamber 25 to atmosphere through the outlet 45, and the control edge 14 blocks the line 13a from the chamber 25.

To ensure that when the accelerator is released the hydraulic line 19 will actually carry a pressure reduced substantially to atmospheric pressure and thus the spring 8 will move the piston 7 to the right to the clutch disengage position, a control valve 30 is provided, the preferred embodiments of which are described in greater detail in the aforementioned U.S. application Ser. No. 061,058. This control valve is integrated with a so-called kickdown valve present in known transmission control systems and actuated by a lever 40 connected to the accelerator. The main piston 29 of the kickdown valve 30 includes a control piston 36 displaceable in a longitudinal bore 34 within an idle travel associated with the idling position of the accelerator. The longitudinal bore 34 communicates, by way of transverse passages 33, end orifices 32 (in a guide sleeve 31), and a housing pocket 28 with the line 27. The longitudinal bore 34 also contains transverse passages 35 open to atmosphere, such that when the accelerator pedal and thus lever 40 are released, and the end edge 37 of the piston 36 retracts (toward the left) the line 27 and thereby the line 19 are vented to atmosphere. Accordingly, the pressure on the piston surface 18 drops to atmospheric.

The piston 29 of the kickdown valve 30, which is connected to a gas pressure valve delivering the gas pressure of line 20, not shown, is biased to the left in the drawing against guide sleeve 31, acting as a stop, by a spring 43 acting on a spring plate 42 displaceable on a threaded stem 41 of piston 29. In the drawing, the accelerator or associated actuating lever 40 is represented in its released position. The control piston 36 is displaced to the far left by the pressure prevailing in line 27 such that the transverse discharge passages 35 are opened, with the result that the pressurized fluid in the line 27 can escape, and the pressure in line 19 drops nearly to atmospheric pressure. The throttling point 21 provided in the connection to gas pressure line 20, prevents simultaneous reduction of the pressure in gas pressure line 20 to atmospheric pressure as well, in this position; instead, it remains at the idling gas pressure level.

When the control line 19 is vented upon release of the accelerator pedal, the piston 7 of shift valve 5 is moved to the right in the drawing by spring 8, so that the pressure line 4 is connected by way of the step between piston shoulders 22 and 12 to the outlet 45. The pressure chamber 2 of the forward clutch 1 is thereby purged, and the clutch disengages. The positive mechanical connection between the turbine rotor of the torque converter and the running wheels is thereby interrupted, vehicle creeping does not occur, and engine vibrations are not transmitted to the wheels through the transmission. The disengage of the clutch 1 occurs even if the vehicle is moving, such that the vehicle coasts, i.e. without engine braking; that is, as opposed to the embodiment represented in the drawing of the aforementioned U.S. patent application Ser. No. 061,058, the shift valve 5 would always be switched to the disengaging position whenever the accelerator is released.

To assure that coasting automatically occurs only in the normal drive position D of the shift lever, and not in positions "1" and "2", an additional three-way ball valve 46 is provided in the control line 19 and connected by way of a pressure line 47 to a second three-way vall valve 48. The second three-way ball valve 48 receives pressure lines 49 and 50 carrying main pressure by way of the manual control valve, here not shown, in shift lever positions "1" and "2". In either shift lever position, the pressure line 19 is supplied by suitable switching of the three-way valves 46 and 48 with main pressure, ensuring that in these lever positions the piston 7 of shift valve 5 will always be forced toward the left position, that is, the clutch engage position. Thus, when the drive positions "1" or "2" are selected, e.g. for mountain driving, there will be no free wheeling with loss of the braking action of the engine.

Additionally, in the drawing, between the fluid line 51 leading from three-way valve 46 and the hydraulic line 19, a brake pedal position dependent second control valve 52 is interposed. This second control valve, which is optional, ensures that when the brake pedal is actuated, and when therefore the moving vehicle is decelerating, the forward clutch remains engaged, so that the vehicle does not coast and the engine helps to decelerate the vehicle.

The second control valve 52 has a control piston 53 with three shoulders 56, 57 and 58. A spring 59, whose force can be adjusted by means of a plate 60 displaceable with an adjusting screw 61, acts on one end of the piston 53. A plunger 65 of an electromagnet 54 acts on the opposite end 55 of piston 53 in opposition to the spring 59 when the electromagnet is energized.

The electromagnet 54 is controlled by switches 67 and 72 arranged in circuit 66. Switch 67 is actuated by a control 68 dependent on road speed and switch 72 by a control 73 dependent on brake pedal position. Thus, the plunger 65 of the electromagnet 54 is displaced to the left in the drawing only when both switch 72 is closed by actuation of the brake pedal of the vehicle and switch 67 is closed at road speeds above a preselected value. In this case, the plunger 65 of electromagnet 54 would displace the piston 53 of control valve 52 to the left in the drawing, so that edge 57b of the middle shoulder 57 establishes a connection between the fluid line 19 and a line 62 connected to a source of main pressure. The main pressure then acts on the first piston surface 18 of piston 7 of the main control valve 5 and displaces it likewise to the left in the drawing, so that the fluid line 4 communicates with line 6 from the manual control valve, and the forward clutch 1 remains in the engaged position.

At times when the electromagnet 54 is de-energized, that is, if either switch 72 or switch 67 is open (either the brake pedal is not actuated or the vehicle is traveling at a speed below a pre-selected value), then the piston 53 of control valve 52 is displaced by spring 59 into the position to the extreme right in the drawing, where the fluid line 19 and the line 51 coming from the three-way valve 46 are connected by edge 57a. Thus, the line 19, unless the gear select lever is moved to "2" or "1" (that is, when the gear select lever is in automatic forward drive "D") carries pressure dependent on the accelerator pedal position. This pressure is at least the idle pressure, when the accelerator is partially depressed from the release position, except when the accelerator is released completely, whereupon the purging control valve 30 described above vents the fluid lines 27, 51 and 19 to reduce the pressure on the first piston surface 18 to nearly atmospheric pressure.

The brake pedal position-dependent second control valve 52 also includes outlets 63 and 64, which communicate with atmosphere to vent the chambers associated with the two faces of piston 53 and permit the piston 53 to move freely back and forth (as controlled by the spring 59 and the electromagnet 54).

The brake pedal position dependent control 73 includes a piston 74 movably held by a diaphragm 76, which is connected to the switch 72. A spring 75 acts on the piston 74 in opposition to a pressure supplied through line 77. This pressure supplied by way of line 77 may be the pressure of the brake system, present when the brake pedal is actuated, which displaces the piston 74 against the action of the restoring spring 75 towards the right in the drawing to close the switch 72 when the brake pedal is depressed.

The speed dependent control 68 may be of similar construction, and includes a piston 69 and movable diaphragm 71 acted upon by a spring 70 against the pressure supplied by way of a line connection 13b. The connection 13b communicates with the source of fluid pressure dependent on road speed, namely the so-called governor pressure, in line 13. The force of the restoring spring 70 is so calculated that above a certain road speed, for example, about 30 to 40 km/hour, the piston 69 of the speed dependent control 68 is displaced to the right in the drawing against the force of spring 70 that the switch 67 closes and will remain closed above the preselected vehicle speed. Thus, above the preselected speed, the brake pedal dependent control 52 is actuated whenever the brake pedal is depressed and the forward clutch 1 remains engaged to provide engine braking during deceleration.

The invention has been described and illustrated with reference to certain preferred embodiments thereof. Variations and modifications will be apparent to persons skilled in the art without departing from the inventive concepts disclosed herein. All such modifications and variations are intended to be within the scope of the invention as defined in the following claims.

I claim:

1. In a control system for an automatic transmission of a motor vehicle having an accelerator pedal, said transmission having a mechanical planetary gear train with at least one hydraulically actuatable gear shift element, a gear select lever having a plurality of selectable forward drive positions, a source of first pressurized hydraulic fluid, a manual control valve means, responsive to the position of said lever, for delivering said first fluid to a selected gear shift element when said lever is in one of said forward drive positions, and a main control valve, responsive to the position of said accelerator pedal and the speed of said vehicle, for controlling the supply of said first fluid from said manual control valve to said selected element, said main control valve comprising a piston having a first piston surface, said piston being displaceable between a first position for connecting said supply of first fluid and a second position for interrupting said supply of first fluid, spring means acting on said piston, and means communicating with said main control valve for delivering an accelerator pedal position-dependent second fluid pressure for acting on said first piston surface in opposition to said spring means, wherein upon release of said accelerator pedal said second fluid pressure is reduced such that said spring means moves said piston into said second position; the improvement wherein said piston has a second piston surface opposed to said first piston surface, and means for providing a vehicle speed-dependent third fluid pressure for acting on said second piston surface in opposition to said accelerator pedal position-dependent pressure only when said piston is in said second position.

2. A control system according to claim 1, wherein said piston has two spaced-apart piston shoulders of unequal diameter, said shoulders having an annular step area therebetween forming said second piston surface on the larger of said shoulders.

3. A control system according to claim 1 or 2, comprising brake pedal position-dependent means acting on said second fluid pressure delivery means for controlling the supply of second fluid pressure to said first piston surface.

4. A control system according to claim 3, wherein said vehicle comprises a brake pedal and a source of main pressurized fluid, wherein said brake pedal position-dependent means comprises control piston means displaceable between a first position for connecting said second fluid pressure and said first piston surface and a second position for interrupting the supply of said second fluid pressure and connecting said main pressurized fluid to said first piston surface, said control piston means further comprising spring means acting on said control piston means and actuation means acting on said control piston means in opposition to said spring means for actuating said control piston for moving said control piston to said second position when said brake pedal is depressed.

5. A control system according to claim 4, wherein said actuation means comprises vehicle speed dependent means for preventing actuation of said control piston when said vehicle speed is below a pre-selected minimum.

6. A control system according to claim 4, wherein said actuation means comprises electromagnetic means coupled to said control piston, and switch means responsive to the position of said brake pedal for actuating said electromagnetic means.

7. A control system according to claim 5, wherein said actuation means comprises electromagnetic means coupled to said control piston and switch means responsive to the position of said brake pedal for actuating said electromagnetic means.

8. A control system according to claim 7, wherein said said actuation means comprises second switch means responsive to vehicle speed for preventing actuation of said electromagnetic means when said vehicle speed is below a preselected minimum.

* * * * *